(12) United States Patent
Mauch

(10) Patent No.: US 9,260,154 B2
(45) Date of Patent: Feb. 16, 2016

(54) HANDLEBAR GRIP

(75) Inventor: Johann Mauch, Bad Urach (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 1132 days.

(21) Appl. No.: 12/520,329

(22) PCT Filed: Dec. 20, 2007

(86) PCT No.: PCT/EP2007/011286
§ 371 (c)(1),
(2), (4) Date: Jun. 19, 2009

(87) PCT Pub. No.: WO2008/074510
PCT Pub. Date: Jun. 26, 2008

(65) Prior Publication Data
US 2010/0018338 A1 Jan. 28, 2010

(30) Foreign Application Priority Data
Dec. 20, 2006 (DE) .......... 10 2006 060 345

(51) Int. Cl.
*G05G 11/00* (2006.01)
*B62K 23/04* (2006.01)

(52) U.S. Cl.
CPC ............. *B62K 23/04* (2013.01); *Y10T 74/2028* (2015.01)

(58) Field of Classification Search
CPC ...... Y10T 74/2028; B62K 23/04; B62L 3/026
USPC .......... 74/488–9, 502.2, 504, 473.12, 473.14, 74/489; 180/335; 123/399–400; 73/114.36, 862.61, 862.541, 161

IPC ............................................. B62K 23/04,11/14
See application file for complete search history.

(56) References Cited

U.S. PATENT DOCUMENTS

| 2,776,579 | A |   | 1/1957 | Nichel |
|---|---|---|---|---|
| 3,752,006 | A | * | 8/1973 | Bartlett ........................... 74/489 |
| 4,461,189 | A |   | 7/1984 | Rottenkolber et al. |
| 5,134,897 | A |   | 8/1992 | Romano |
| 5,307,692 | A | * | 5/1994 | Kaplan ................... 73/862.541 |
| 5,370,017 | A | * | 12/1994 | Krauer ......................... 74/502.2 |

(Continued)

FOREIGN PATENT DOCUMENTS

| AT | 0319068 B | * | 12/1974 |
|---|---|---|---|
| AT | 002 069 U1 |   | 4/1998 |

(Continued)

OTHER PUBLICATIONS

Maki et al., WO2005115824A1 machine translation, generated by the JPO online machine translation service Jun. 16, 2012.*

(Continued)

*Primary Examiner* — Adam D Rogers
(74) *Attorney, Agent, or Firm* — Alan D. Kamrath; Kamrath IP Lawfirm, P.A.

(57) ABSTRACT

A handlebar grip (10) for a throttle twist grip (1) is arranged on a handlebar tube of a vehicle and is intended for actuating an actuator which determines the fuel supply for an internal combustion engine of the vehicle). The handlebar grip (10) has a spring engagement section (12) for engagement of a restoring spring (20). The spring engagement section (12) is formed in an outer region of the handlebar grip (10) in the longitudinal direction of the handlebar grip (10).

18 Claims, 9 Drawing Sheets

(56) References Cited

U.S. PATENT DOCUMENTS

| | | | |
|---|---|---|---|
| 5,802,927 A | 9/1998 | Yu et al. | |
| 5,893,295 A | 4/1999 | Bronnert | |
| 8,272,294 B2 * | 9/2012 | Ashman | 74/531 |
| 2004/0216550 A1 * | 11/2004 | Fallak et al. | 74/551.9 |

FOREIGN PATENT DOCUMENTS

| | | |
|---|---|---|
| DE | 837812 C | 5/1952 |
| DE | 847265 C | 8/1952 |
| DE | 29705389 U1 | 5/1997 |
| DE | 10027193 A1 | 12/2001 |
| EP | 1553277 A1 | 7/2005 |
| JP | 3-50905 U | 5/1991 |
| JP | 11310183 A | 11/1999 |
| JP | 2010149684 A * | 7/2010 |
| WO | WO2005042306 A2 | 5/2005 |
| WO | WO2005115824 A1 | 12/2005 |

OTHER PUBLICATIONS

Glavanovics, Michael. AT002,069U1 machine translation, generated by espacenet online translation service Jan. 7, 2013.*

* cited by examiner

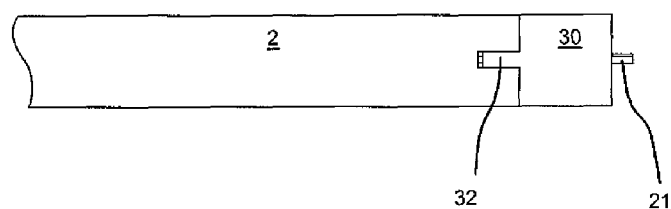
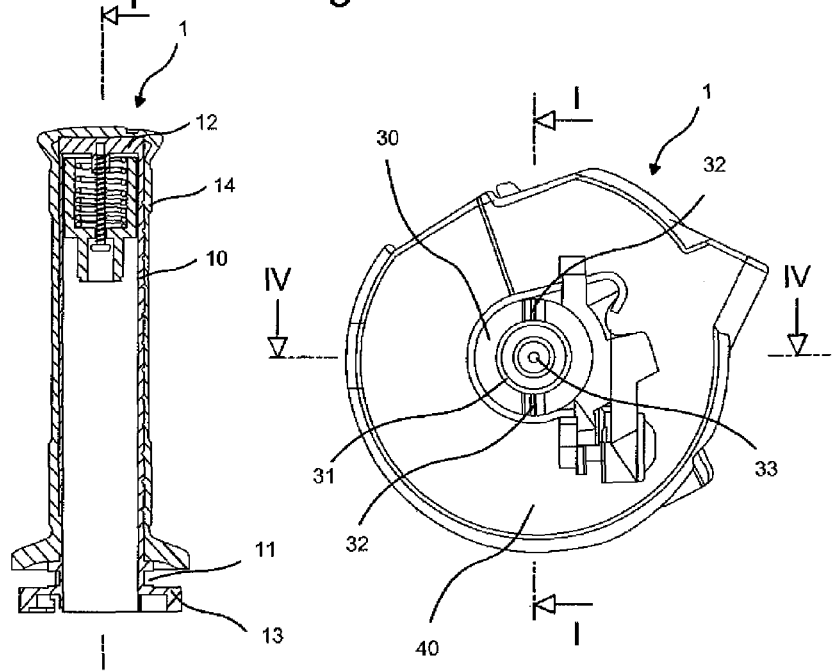

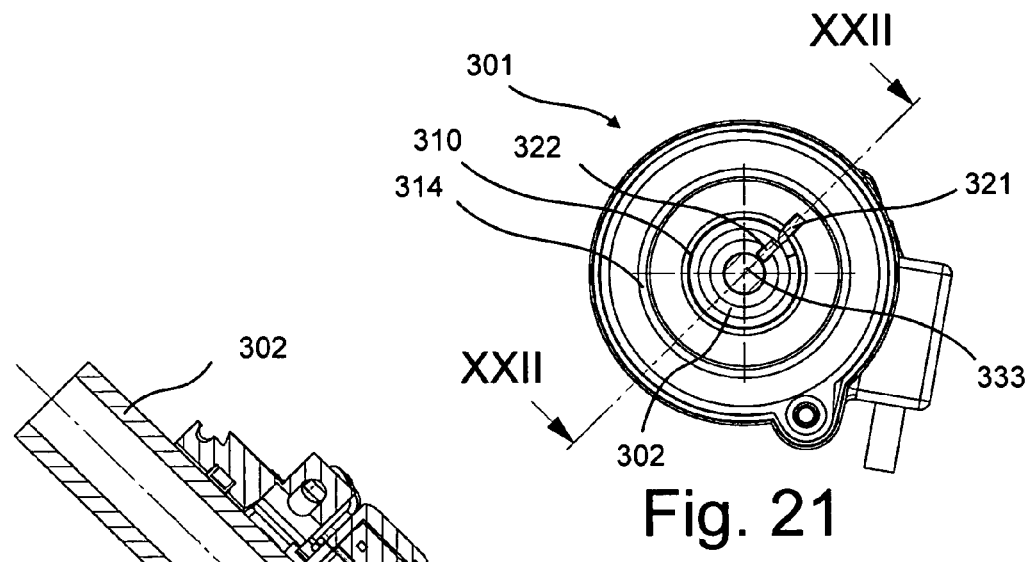
Fig. 21
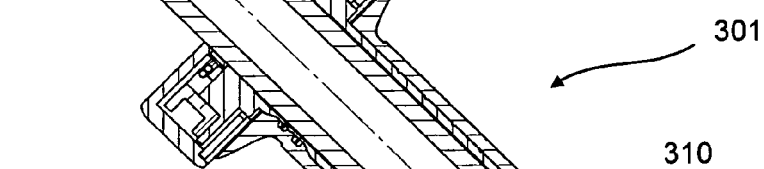
Fig. 22
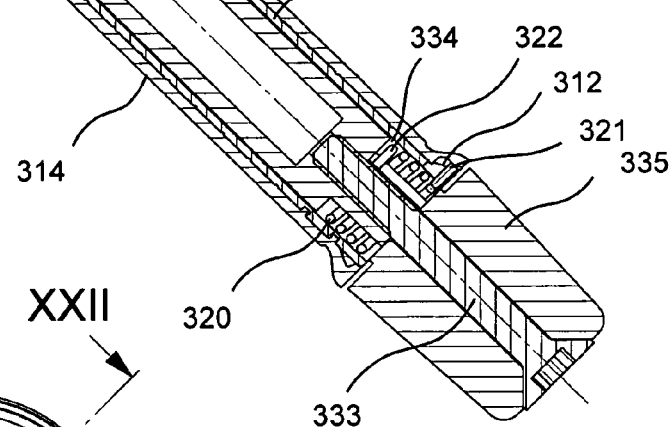
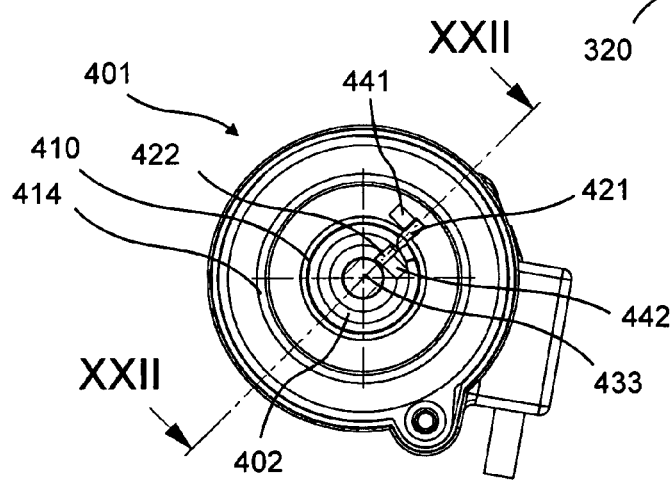
Fig. 23

HANDLEBAR GRIP

The invention relates to a handlebar grip and a throttle twist grip having such a handlebar grip for vehicles with an internal combustion engine.

Throttle twist grips are disclosed, for example, in DE 30 13 008 A1. In the case of the throttle twist grips disclosed there, the handlebar grip is connected to a cable drum holding a Bowden cable. With the aid of the Bowden cable, the actuator is actuated. For opening the throttle, the handlebar grip is turned against the restoring force of the cable pull. If the throttle twist grip is released, the handlebar grip turns back to its starting position (idling position) owing to the restoring force.

DE 837 812 C discloses a bicycle twist grip having a slotted handlebar grip, in which the actuation of the bell of the indicator or of the brake is effected by brief turning of the twist grip back and forth. A torsion spring having a corresponding pretension, which holds the twist grip in its end position without vibration, is connected between the handlebar grip and a conical clamping device. In contrast, in the embodiments according to the invention, the handlebar grip has an open outer end, and the space for holding the restoring spring is closed on the outside by the counterweight. According to the invention, the counterweight can be connected integrally to the handlebar, welded thereto, fitted therein, adhesively bonded therein or connected otherwise to the handlebar tube.

AT 2069 U1 discloses a control device for speed control of an electric bicycle motor, in which the sensor and the recuperating spring are arranged in an internal region of the twist grip. In contrast to the embodiments according to the invention, the recuperating spring is in the form of a pressure spring and not in the form of a torsion spring.

U.S. Pat. No. 5,893,295 discloses a hand grip having an apparatus for automatic riding control, in which balls running on ramps are provided. The chosen fuel position is maintained owing to a frictional force of the apparatus for automatic riding control. On rotation of the hand grip against the throttle opening direction, the frictional force is automatically eliminated.

WO 2005115824 A1 and JP 03-50 905 U each disclose hand grips in which the sensor is arranged inside the handlebar tube. In the embodiments of the invention, the sensor is on the other hand arranged outside the handlebar tube. This has the advantage that no rod need be arranged in the handlebar tube.

Throttle twist grips having handlebar grips in which the rotational position of the throttle twist grip is converted into an electric signal which is used for actuating an actuator which influences the fuel position are also known. Such handlebar grips are disclosed in DE 100 27 193 A1, the entire disclosed content of which is to be incorporated by reference into the present disclosure. In particular, the technology described there can be combined with the features of the present invention, with respect to how an electric control signal which is a measure of the rotational position of the throttle twist grip can be obtained. Of course, other techniques known to the person skilled in the art can also be used in association with the present invention in order to obtain an electric signal which is a measure of the position of the throttle twist grip.

In the case of the known throttle twist grips in which the rotational position of the handlebar grip is converted into an electric signal, the throttle twist grip is turned against the action of a restoring spring in order to open the throttle, as disclosed in DE 100 27 193 A1. The restoring spring is arranged on that side of the throttle twist grip which is close to the middle of the handlebars and, with one end, engages a spring engagement section of the handlebar grip which is arranged in a handlebar region which is close to the middle of the handlebars. In the case of the known throttle twist grips, there is the disadvantage that the installation space in the region of the rider's thumb, which is limited by further switching elements, such as, for example, a light switch, an indicator switch, a gear shift, etc., is required for the arrangement of the restoring spring.

It is therefore the object of the invention to develop the handlebar grip according to the precharacterizing clause of claim 1 in such a way that it is possible to provide throttle twist grips having restoring springs and electric control signals, which throttle twist grips require substantially the same installation space as known throttle twist grips with mechanical actuation.

In relation to this description, the term "outer region of the handlebar grip" designates a region of the handlebar grip which is located on the side remote from the middle of the handlebars in the case of a handlebar grip mounted on a handlebar or which is located on the side remote from the middle of the vehicle in the case of a handlebar grip mounted on a handlebar of a vehicle. The outer region of the handlebar grip can thus also be referred to as "region remote from the middle of the handlebars" or "region close to the vehicle side", i.e. a region which is close to the vehicle side in the case of a handlebar grip mounted on a handlebar of a vehicle.

According to the invention, the handlebar grip has a spring engagement section for engaging a restoring spring for a throttle twist grip arranged on a handlebar tube of a vehicle and intended for actuating an actuator which determines the fuel supply for an internal combustion engine of the vehicle. The spring engagement section is formed in an outer region of the handlebar grip in the longitudinal direction of the handlebar grip.

According to the invention, there is the advantage that the limited installation space in the region of the handlebar, laterally inside the handlebar grip, is not required for the restoring spring. Consequently, the housing can be made smaller and in the usual manner. This results in lower development and manufacturing costs.

According to the invention, the handlebar grip can have a sensor holding section for holding a sensor for detecting the rotational position of the handlebar grip. The spring engagement section is formed in an inner region of the handlebar grip in the longitudinal direction of the handlebar grip. The spring engagement section and the sensor holding section can be formed at opposite end regions of the handlebar grip, relative to the longitudinal direction of the handlebar grip.

According to the invention, the handlebar grip can have a mounting section for mounting the handlebar grip on the handlebar in such a way that it is rotatable about the axis of the handlebar in the grip region. The spring engagement section is formed in an inner region of the handlebar grip in the longitudinal direction of the handlebar grip. Preferably, the spring engagement section and the mounting section can be formed on opposite sides of the handlebar grip, relative to the longitudinal direction of the handlebar grip.

According to the invention, the mounting section can be formed outside the sensor holding section, relative to the longitudinal direction of the handlebar grip.

The invention also relates to a throttle twist grip having a handlebar grip according to the invention.

The throttle twist grip according to the invention furthermore has at least one restoring spring. It is also possible to provide a plurality of restoring springs or other restoring elements which are arranged at least partly in the outer region of the throttle twist grip.

According to the invention, the restoring spring can be in the form of a torsion spring. The torsion spring can be in the form of a helical spring or in the form of a torsion bar.

According to the invention, the throttle twist grip can furthermore have a spring housing.

According to an embodiment of the invention, the spring housing can be fixed, preferably by means of a screw and/or bolt connection, to the spring engagement section of the handlebar grip to be rotatable about the longitudinal axis of the handlebar grip.

According to the invention, the spring housing can have an external diameter which substantially corresponds to the internal diameter of the handlebar grip. Thus, the external diameter of the spring housing can substantially correspond to the external diameter of the handlebar tube and is an extension of the handlebar tube on which the handlebar grip is arranged.

According to the invention, the spring housing can have an engagement section for engagement in a nonrotatable manner in a correspondingly formed engagement section of a handlebar tube. The engagement section of the spring housing can be formed on the inside of the spring housing. Furthermore, the engagement section of the spring housing may have ribs for holding in corresponding recesses provided on a handlebar tube.

According to a further embodiment of the invention, the throttle twist grip can furthermore have a handlebar weight. It is possible for the spring housing to be integrated in the handlebar weight. The handlebar weight can be formed in such a way that it can be fixed in a nonrotatable manner to a handlebar tube, preferably by a screw and/or bolt connection.

According to a further embodiment of the invention, the spring housing can be integrated in that region of the handlebar tube which is an outer region relative to the handlebar. The throttle twist grip may also have a handlebar weight. Furthermore, the spring housing can be formed in such a way that it can be inserted into that region of the handlebar tube which is an outer region relative to the handlebar.

According to the invention, the restoring spring can have a handlebar grip engagement section for engaging the handlebar grip and a spring housing engagement section for engaging the spring housing.

According to the invention, the sensor or the sensors can be in the form of an angle sensor and, in particular, in the form of a contactless and/or non-contact angle sensor and/or potentiometric angle sensor and/or in the form of a Hall sensor, in the form of a Hall-effect pick-up, in the form of a Hall controller, in the form of a gyroscopic sensor, in the form of a piezo sensor, in the form of a position sensor and, in particular, in the form of a magnetostrictive position sensor, in the form of a shaft encoder and, in particular, in the form of a magnetic incremental encoder, in the form of a magnetic angle sensor and, in particular, in the form of a magnetic scale sensor, in the form of a cable extension sensor, in the form of an inductive sensor, in the form of a capacitive sensor and/or in the form of an optoelectronic angle sensor.

Alternatively or in addition to the angle sensor, at least one pressure sensor and preferably two pressure sensors can be provided for measuring the pressure exerted by the restoring spring. The pressure sensor or sensors can be formed and arranged for holding an end of the restoring spring.

The invention is described in more detail below with reference to the working examples shown in the figures.

FIG. 3 shows a view of a handlebar tube with the spring housing and the spring of the embodiment according to the invention of FIG. 1 from the rear (relative to the riding direction of the vehicle), with the other parts of the throttle twist grip not being shown for the sake of clarity.

FIG. 4 shows a sectional view of the embodiment according to the invention of FIG. 1 along the line IV-IV of FIG. 1.

FIG. 5 shows a view of the embodiment according to the invention of FIG. 1 from the side (relative to the vehicle, from the middle of the vehicle), with the housing holding the connections and the handlebar grip additionally being shown.

FIG. 21 shows a sectional view of the throttle twist grip according to the invention of FIG. 18 along the line XXI-XXI of FIG. 19.

FIG. 22 shows a sectional view of the throttle twist grip according to the invention of FIG. 18 along the line XXII-XXII of FIG. 21.

FIG. 23 shows a view corresponding to FIG. 21, according to a fifth embodiment of the invention, in which at least one pressure sensor is provided and which otherwise corresponds substantially to the fourth embodiment of the invention.

FIGS. 1 to 7 show a first embodiment of the invention.

Figure 6:
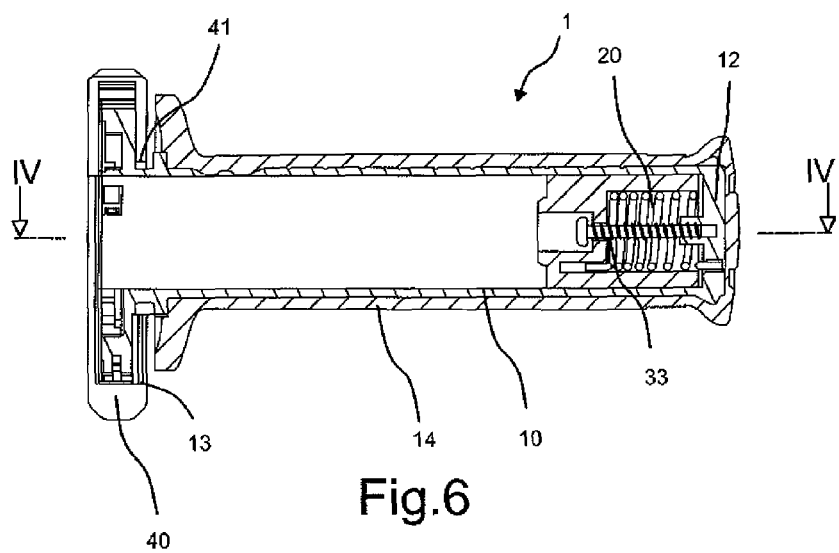
FIG. 6 shows a view corresponding to FIG. 1, with the housing holding the connections and the handlebar grip additionally being shown.
Figure 7:
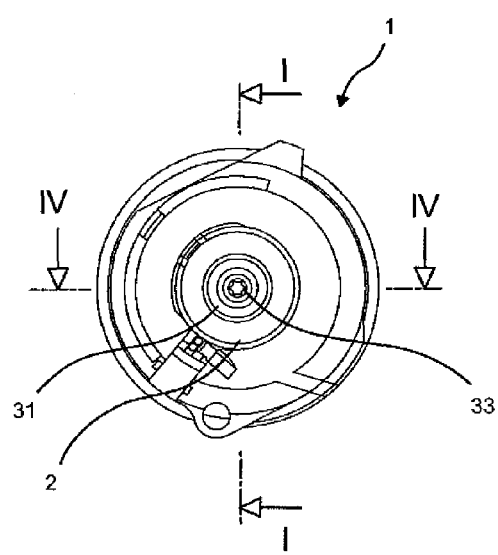
FIG. 7 shows a view corresponding to FIG. 5, with a handlebar tube being shown instead of the housing holding the connections and the handlebar grip.
Figure 8:
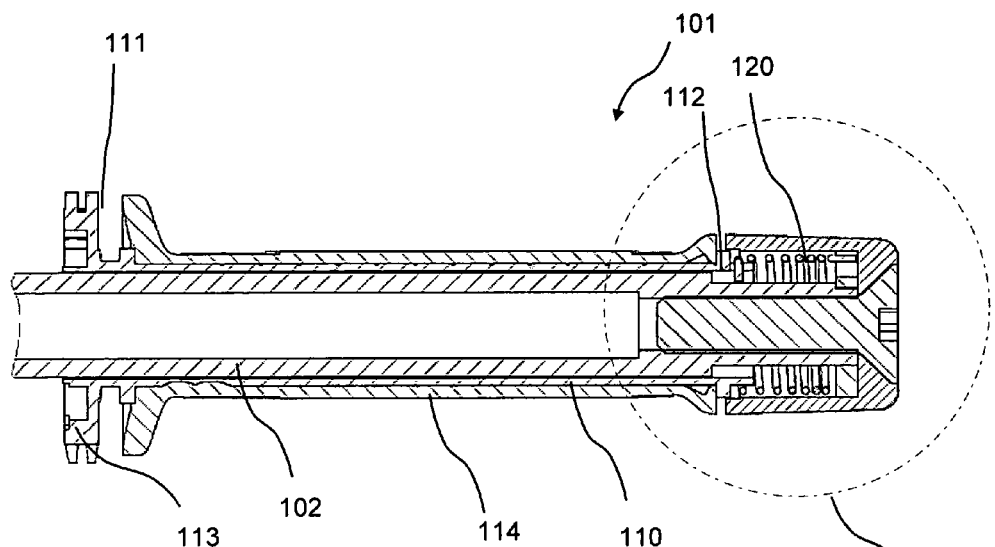
FIG. 8 shows a sectional view of the handlebar grip according to the invention in a throttle twist grip according to the invention, and according to a second embodiment of the invention, along the line VIII-VIII of FIG. 11.
Figure 9:
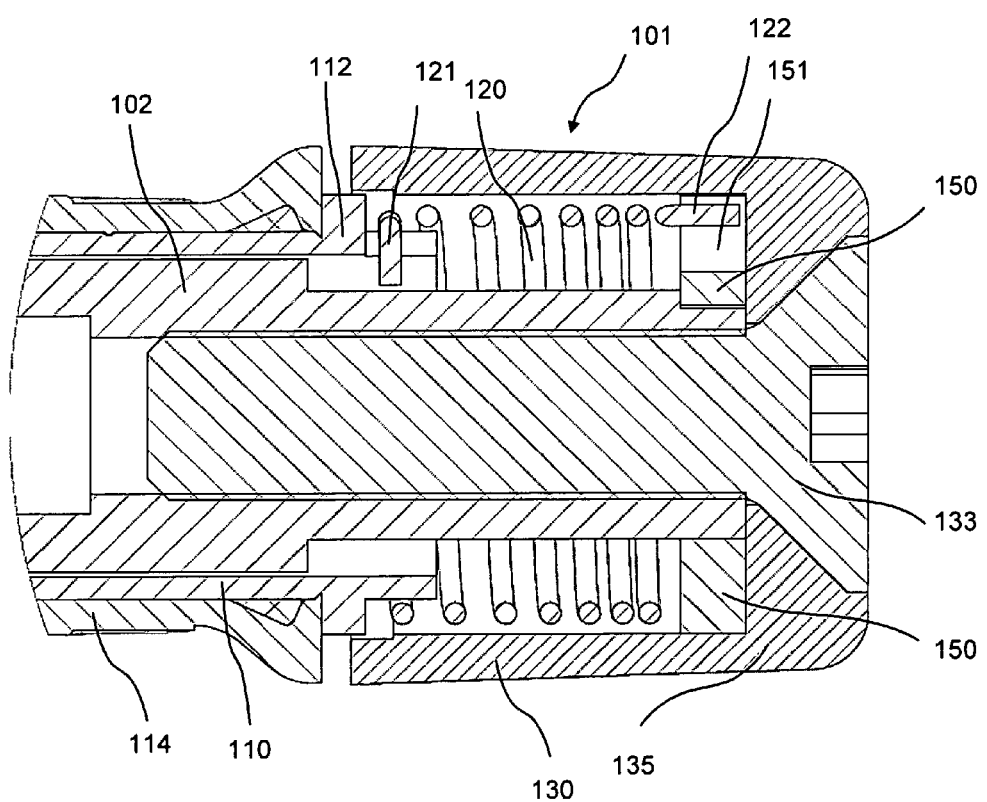
FIG. 9 shows an enlarged cut-out of FIG. 8 in the region of the circle IX shown as a dash-dot line.
Figure 10:
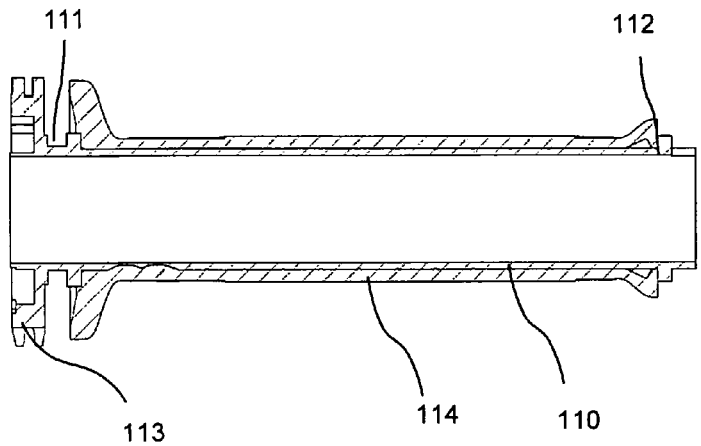
FIG. 10 shows a view corresponding to FIG. 8, with only the handlebar grip and the grip covering being shown.
Figure 11:
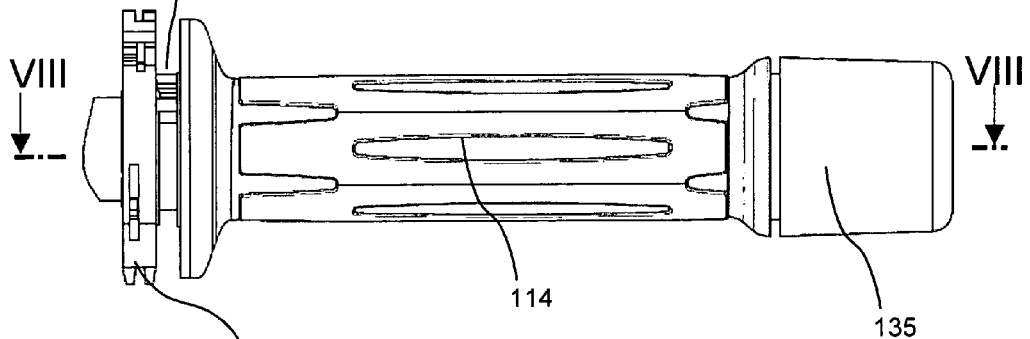
FIG. 11 shows an external view of the throttle twist grip of FIG. 8.
Figure 12:
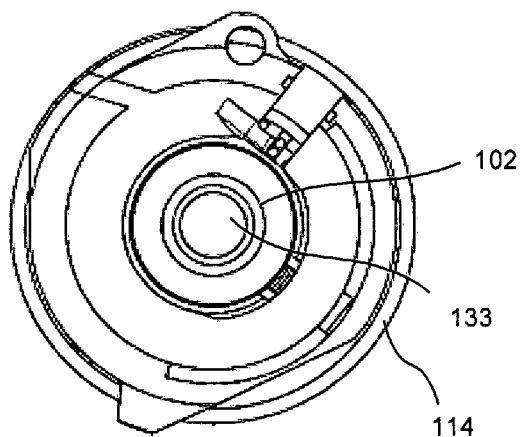
FIG. 12 shows a view, corresponding to FIG. 7, of the throttle twist grip of FIG. 8.
Figure 13:
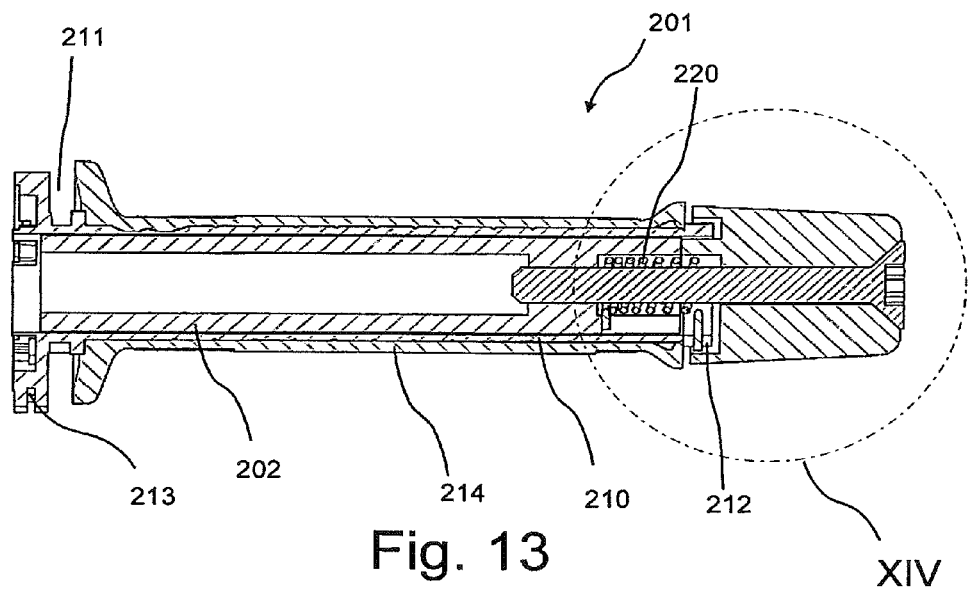
FIG. 13 shows a sectional view of a handlebar grip according to the invention in a throttle twist grip according to the invention, and according to a third embodiment of the invention, along the line XIII-XIII of FIG. 16.
Figure 14:
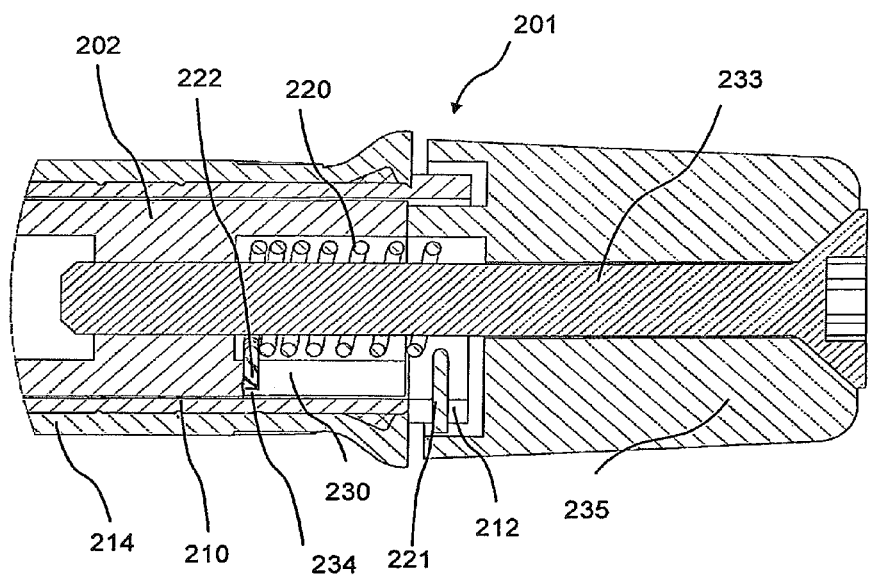
FIG. 14 shows an enlarged cut-out of FIG. 13 in the region of the circle XIV shown as a dash-dot line.
Figure 15:
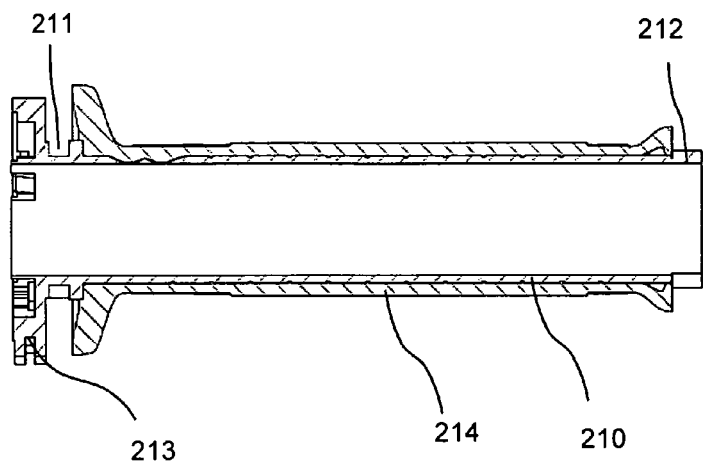
FIG. 15 shows a view corresponding to FIG. 13, with only the handlebar grip and the grip covering being shown.
Figure 16:
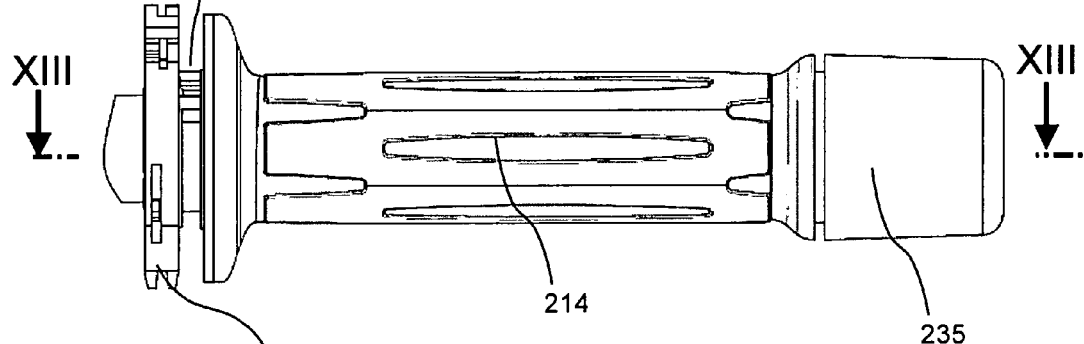
FIG. 16 shows an external view of the throttle twist grip of FIG. 13.
Figure 17:
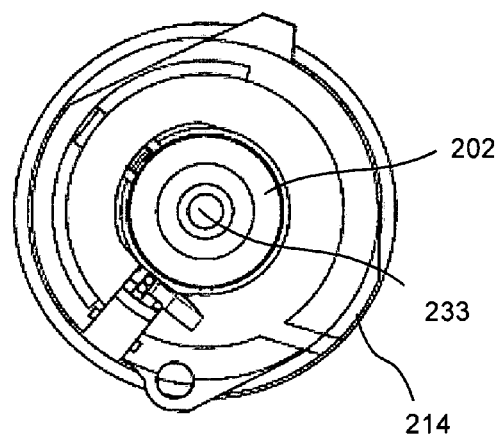
FIG. 17 shows a view, corresponding to FIG. 7, of the throttle twist grip of FIG. 13.
Figure 18:
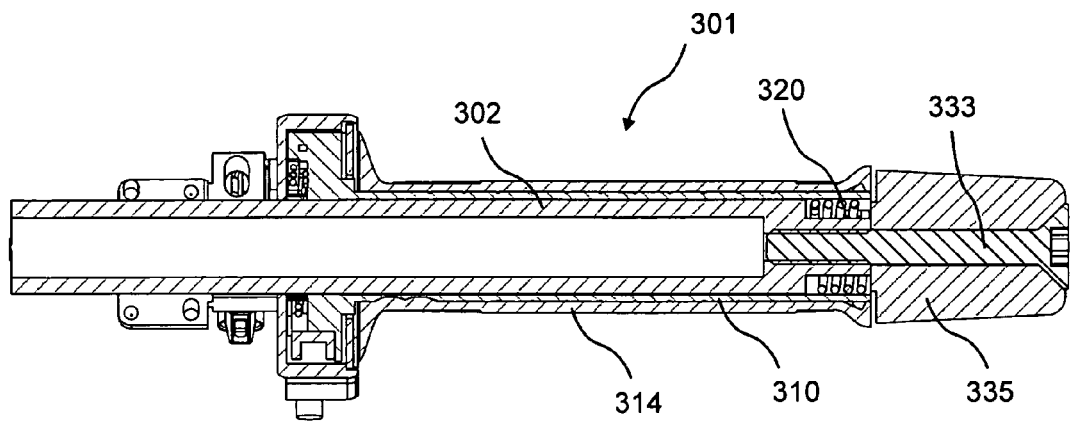
FIG. 18 shows a sectional view of a throttle twist grip according to the invention, and according to a fourth embodiment of the invention, along the line XVIII-XVIII of FIG. 20.
Figure 19:
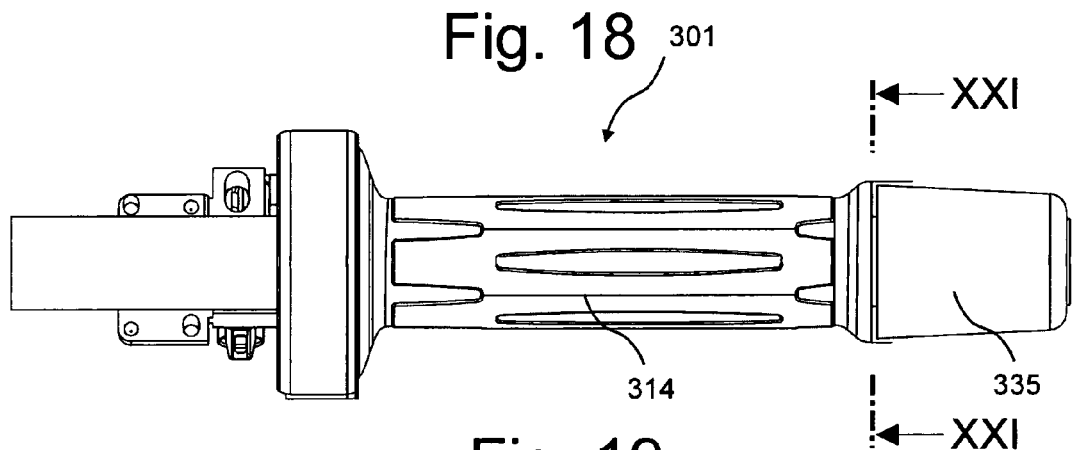
FIG. 19 shows an external view of the throttle twist grip of FIG. 18.
Figure 20:
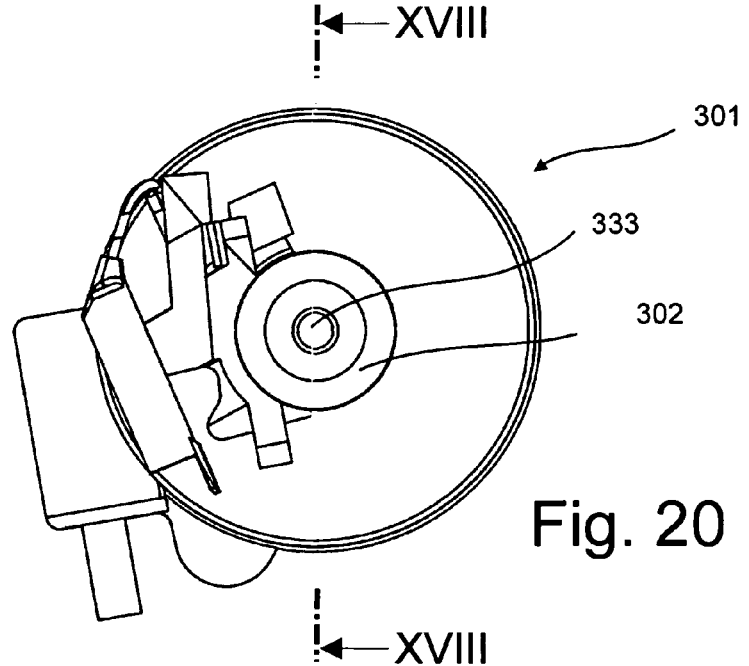
FIG. 20 shows a view of the embodiment according to the invention of FIG. 18 from the side (relative to the vehicle, from the middle of the vehicle).

The throttle twist grip according to the invention is designated as a whole in FIGS. 1 to 7 by the reference numeral 1 and is suitable for being arranged on a handlebar tube 2 (cf. FIGS. 3 and 7). For example, the throttle twist grip 1 can be mounted rotatably on the handlebar tube 2 by the grip housing 40 shown in FIGS. 5 and 6.

The grip tube or handlebar grip 10 according to the invention is not shown separately but only in association with the throttle twist grip according to the invention.

The handlebar grip 10 has an assembly portion or a mounting section 11 (FIG. 1) which is in the form of a groove which is engaged by an inner edge 41 of the housing 40, as shown, for example, in FIG. 6. The housing 40 can be fastened nonrotatably in a known manner on the handlebar tube 2. Consequently, the handlebar grip 10 can be arranged on the handlebar tube to be rotatable and nondisplaceable in the axial direction. Thus, the handlebar grip can be turned about the handlebar tube in a usual manner for opening the throttle.

A grip covering 14 is arranged on the handlebar grip 10. A heating device, for example in the form of a resistance foil or of a heating wire, can be provided in a known manner between grip covering 14 and handlebar grip 10.

The handlebar grip has, on its side which is on the inside relative to the vehicle, a sensor receiving portion or holding section 13 in which a sensor 16 can be held in a known manner, which sensor outputs an electric signal which is a measure of the rotational position of the throttle twist grip relative to the handlebar tube and can be transmitted to a corresponding control device in a known manner for actuating an actuator for opening the throttle. Regarding the options, reference is made explicitly to the disclosure of the above mentioned DE 100 27 193 A1, the disclosure content of which is to be incorporated here by reference in its entirety and in particular in this respect.

The throttle twist grip 1 according to the invention is also provided for use without mechanical actuation of the actuator by a cable pull. Usually, the cable pull is provided with a pressure spring which exerts a restoring force on the throttle twist grip 1 in order to return it to the zero position when the throttle twist grip 1 is released by the rider.

This function is performed by the restoring spring 20. The restoring spring 20 is arranged in the throttle twist grip 1, so that, in contrast to the prior art, the limited installation space in the region of the housing 40 is not required. This has the advantage that the installation space is available for the other components and that a visually pleasing solution is achievable.

The handlebar grip 10 is closed in its region which is on the outside relative to the vehicle and has there a spring engagement section 12 which can be engaged by the restoring spring 20.

The restoring spring 20 is a torsion spring which, in this working example, is in the form of a helical spring or spiral spring. In all embodiments shown, other springs are of course also conceivable, such as, for example, torsion bars or the like. It is also possible to provide a plurality of spring elements. The variant shown and comprising a torsion spring by which a simple design is achievable is preferred.

Figure 1:
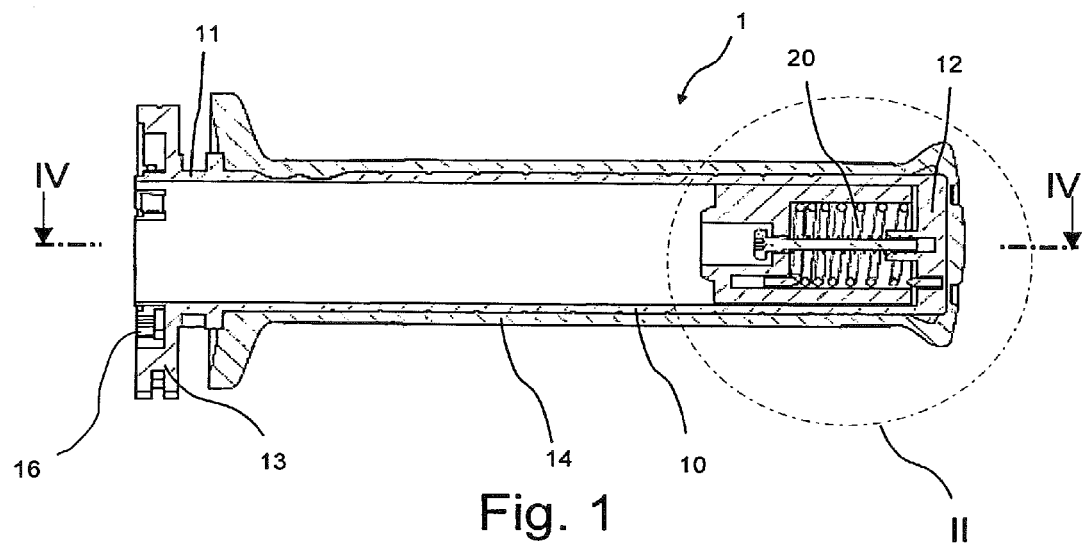
FIG. 1 shows a sectional view of a handlebar grip according to the invention in a throttle twist grip according to the invention, and according to a first embodiment of the invention, along the line I-I of FIG. 4.
Figure 2:
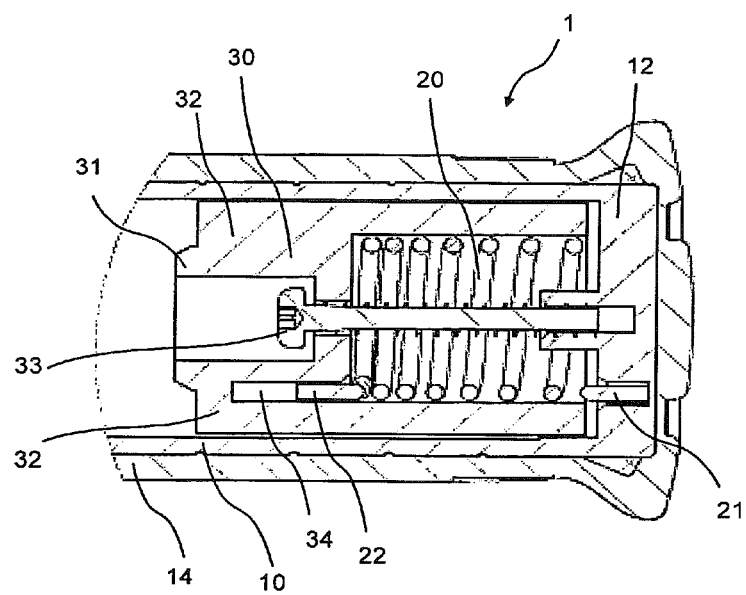
FIG. 2 shows an enlarged cut-out of FIG. 1 in the region of the circle II shown as a dash-dot line.

The restoring spring 20 is held in a spring engaging portion or housing 30 and has a handlebar grip engagement section 21 for engagement of the spring in the handlebar grip and a spring housing engagement section 22 for engagement of the spring in a spring engagement section 34 of the spring housing 30 (FIG. 2).

The spring housing 30 is formed in such a way that it can be mounted nonrotatably relative to the handlebar tube 2. For this purpose, it has an extension 31 on which ribs 32 are arranged, which ribs engage corresponding recesses which are provided on the handlebar tube 2. The spring housing 30 is rotatably fixed by means of a screw 33 on the spring engagement section 12 of the handlebar grip 10.

The throttle twist grip 1 can be provided as a preassembled unit with or without the housing 40. The restoring spring 20 can be preassembled in the spring housing 30. For this purpose, the restoring spring 20 can be inserted into the spring housing 30 in such a way that the spring housing engagement section 22 engages a corresponding spring engagement section of the spring housing 30. The spring housing 30 can then be preassembled with the restoring spring in the handlebar grip 10. For this purpose, the handlebar grip engagement section 21 of the restoring spring 20 can be introduced into a corresponding spring engagement section 12 of the handlebar grip 10, and the spring housing 30 can be rotatably fixed on the handlebar grip 10 by means of the screw 33.

If the throttle twist grip 1 is subsequently mounted on the handlebar tube 2, it should be ensured that the rotation-prevention elements (e.g. the ribs 32) mounted on the spring housing 30 are positioned correctly relative to the corresponding recesses (or extensions, etc. in the case of other conceivable rotation-prevention elements). The restoring spring 20 is then pretensioned by turning the throttle twist grip 1 to a specific desired position in which the throttle twist grip 1 is secured by screwing the housing 40 on the handlebar tube 2. The handlebar grip 10 of the throttle twist grip 1 can then be turned in a direction from its zero position (idling position) and, owing to the restoring force of the restoring spring 20, returns to this position, for example, on releasing the throttle twist grip 1.

FIGS. 8 to 12 show a second embodiment of the invention. In comparison with the preceding embodiment, identical or corresponding parts are designated by the same reference numerals incremented by 100. Below, the differences in the embodiment shown in FIGS. 8 to 12 compared with the first embodiment shown in FIGS. 1 to 7 and described above are described. Otherwise, reference is made to the above description of the first embodiment.

In the case of the embodiment shown in FIGS. 8 to 12, the spring housing 130 is integrated in a handlebar weight 135 which can be fixed to the handlebar tube by means of a screw 133. The handlebar grip 110 has a mounting section 111 and a sensor holding section 113, and a grip covering 114 is arranged on the handlebar grip 110.

Preventing rotation of the restoring spring 120 relative to the handlebar tube 102 is realized by a disc 150 which is mounted at the end of the handlebar tube 102 in a nonrotatable manner and which has a spring engagement section 151.

The restoring spring 120 is arranged outside the handlebar grip 110 (i.e. laterally outside relative to the vehicle) and in the spring housing 130 integrated in the handlebar weight 135. The restoring spring 120 has a handlebar grip engagement section 121 for engagement of the restoring spring 120 in the handlebar grip 110 and a tang or spring housing engagement section 122 for engagement of the restoring spring 120 in the spring engagement section 151 integrated in the disc 150.

For mounting, the handlebar grip engagement section 121 of the restoring spring 120 is arranged in the corresponding recess of the handlebar grip 110, and the spring housing engagement section or tang 122 of the restoring spring 120 is arranged in the corresponding spring engagement section 112 of the handlebar weight 135 (spring housing 130).

The restoring spring 120 is then pretensioned by turning the throttle twist grip 101 to a specific desired position in which the throttle twist grip 101 is secured on the handlebar tube 102 by fixing the housing, which is not shown (cf. first working example, housing 40).

FIGS. 13 to 17 show a third embodiment of the invention. In comparison with the preceding embodiments, identical or corresponding parts are designated by the same reference numerals incremented by 100 or 200. Below, the differences in the embodiment shown in FIGS. 13 to 17 compared with the first two embodiments shown in FIGS. 1 to 7 and 8 to 12, respectively, and described above are described. Otherwise, reference is made to the above description of the first two embodiments.

In the case of the embodiment shown in FIGS. 13 to 17, the spring housing 230 is integrated in the handlebar tube 202. In other words, the restoring spring 220 is arranged in the handlebar tube 202 and there engages, for example, a driver which is positioned firmly on the handlebar tube 202. The handlebar grip 210 has a mounting section 211 and a sensor holding section 213, and a grip covering 214 is arranged on the handlebar grip 210.

The restoring spring 220 is arranged inside the handlebar grip 210 in the handlebar tube 202, which is in the form of a spring housing 230 there. The restoring spring 220 has a handlebar grip engagement section 221 for engagement of the restoring spring 220 in the handlebar grip 210, and a handlebar tube engagement section 222 for engagement of the restoring spring 220 in the handlebar tube 202.

For mounting, the handlebar grip engagement section 221 of the restoring spring 220 is arranged in the corresponding recess of the handlebar grip 210, and the handlebar tube engagement section 222 of the restoring spring 220 is arranged in a corresponding spring engagement section of the handlebar tube 202 (spring housing 230) fixed by a screw 233.

The restoring spring 220 having a spring engagement section 234 is then pretensioned by turning the throttle twist grip 201 to a specific desired position in which the throttle twist grip 201 is secured on the handlebar tube 202 by fixing the housing, which is not shown (cf. first working example, housing 40).

FIGS. 18 to 22 show a fourth embodiment of a throttle twist grip 301 of the invention. In comparison with the preceding embodiments, identical or corresponding parts are designated by the same reference numerals incremented by 100, 200 and 300, respectively. Below, the differences in the embodiment shown in FIGS. 18 to 22 in comparison with the first three embodiments shown in FIGS. 1 to 7, 8 to 12 and 13 to 17, respectively, and described above are described. Otherwise, reference is made to the above description of the preceding three embodiments.

That embodiment of the invention which is shown in FIGS. 18 to 22 correspond substantially to that embodiment of the invention which is shown in FIGS. 13 to 17. The drawings of the embodiment shown in FIGS. 18 to 22 show components which are mounted on the handlebar tube and which are not shown in the case of the embodiment shown in FIGS. 13 to 17, for the sake of clarity. Furthermore, the handlebar tube 302 is always shown in the case of the embodiment shown in FIGS. 18 to 22. Reference is therefore made in particular to the description of the working examples shown in FIGS. 13 to 17, identical components being designated by a reference numeral incremented by 100 not being explicitly designated again.

A restoring spring 320 has a handlebar grip engagement section 321 and a spring housing engagement section 322. A spring engagement section 334 is fixed by a screw 333. In contrast to the working example shown in FIGS. 13 to 17, the restoring spring 320 does not project into the handlebar weight 335 in the case of the working example shown in FIGS. 18 to 22. In contrast to the handlebar weight 235, the handlebar weight 335 has no recess into which the restoring spring 220 projects. The handlebar tube 302 likewise extends in the direction of the handlebar weight 335 substantially just as far as the handlebar grip 310. In other words, the spring space is formed between the handlebar tube 302 and the handlebar grip 310 and is closed at the end by the handlebar weight 335. In the embodiment of FIGS. 13 to 17, the spring space is likewise formed between the handlebar tube 202 and the handlebar grip 210. However, it extends a little further into the handlebar weight 235, the handlebar tube 202 likewise extending into the handlebar weight. The handlebar weight 235 terminates the spring space at the end and forms a lateral boundary of the spring space in the lateral region adjacent to the end face.

In the embodiment of FIGS. 13 to 17, the spring engagement section 212 is formed in a region which is surrounded by the handlebar weight 235, whereas in the embodiment of FIGS. 18 to 22, the spring engagement section 312 is formed in a region which is surrounded by the grip covering 314.

That embodiment of a throttle twist grip 401 according to the invention which is shown in FIG. 23 corresponds substantially to that embodiment of the invention which is shown in FIGS. 18 to 22, the description and figures of which are referred to, the views of FIGS. 18 to 20 and 22 being identical, and the views of FIGS. 21 and 23 corresponding apart from the differences mentioned below, the reference numerals of the corresponding components being incremented by 100 in the case of the embodiment of FIG. 23.

The embodiment shown in FIG. 23 has a handlebar tube 402, a grip covering 414 arranged on a handlebar grip 410, and a screw 433. Pressure sensors 441, 442 which engage the ends (throttle grip engagement section 421 and spring housing engagement section 422) of the restoring spring and determine the pressure exerted by the ends of the restoring spring, which pressure is a measure of the angle of rotation of the twist grip. Preferably, pressure sensors 441, 442 are provided at both ends of the restoring spring. A higher accuracy is achieved as a result of the two measured values. It is of course also possible to provide only one pressure sensor 441 or 442, so that only the force exerted at one end of the restoring spring is determined.

In that embodiment of the invention which is shown in FIG. 23, the pressure sensors 441 and 442 can be provided alternatively or in addition to the other sensors.

The invention claimed is:

1. A throttle twist grip arranged on a handlebar tube of a vehicle and intended for actuating an actuator which determines a fuel supply for an internal combustion engine of the vehicle, with the throttle twist grip comprising:
    a restoring spring having a first engagement section and a second engagement section opposite to the first engagement section;
    a grip housing adapted to be fixed to the handlebar tube;
    a handlebar grip having an internal diameter adapted to be rotatably received on the handlebar tube, with the handlebar grip including a spring engagement section connected to and extending from the internal diameter and rotatable with the internal diameter, with the restoring spring interconnecting the handlebar grip and the handlebar tube, with the handlebar grip comprising a sensor holding section integrally formed with and extending outwardly of the handlebar grip and rotatable relative to the grip housing, with the sensor holding section rotatably received on the grip housing for mounting the handlebar grip on the handlebar tube to be rotatable about an axis of the handlebar tube, with a recess extending parallel to and spaced from the axis of the handlebar tube, with the spring engagement section extending radially relative to the axis of the handlebar tube from the internal diameter; and a sensor held in the sensor holding section and detecting a rotational position of the handlebar grip relative to the grip housing and the handlebar tube, with the restoring spring spaced from the sensor holding section in a direction parallel to the axis, with the restoring spring located inside the handlebar grip, with the first engagement section fixed relative to the handlebar grip and the second engagement section fixed relative to the handlebar tube, with one of the first and second engagement sections comprising a tang extending parallel to and spaced from the axis of the handlebar tube and having a size of a cross section perpendicular to the axis of the handlebar tube, with the recess having a size of a cross section perpendicular to the axis of the handlebar less than a size of a cross section of the internal diameter of the handlebar grip perpendicular to the axis of the handlebar, with the tang slideably received in and rotatable with the recess about the axis of the handlebar tube, with the other of the first and second engagement sections located intermediate the sensor and the one of the first and second engagement sections.

2. The throttle twist grip according to claim 1, wherein the restoring spring is a torsion spring.

3. The throttle twist grip according to claim 2, wherein the torsion spring is a helical spring.

4. The throttle twist grip according to claim 1, wherein the recess is formed in the spring engagement section of the handlebar grip.

5. The throttle twist grip according to claim 4, wherein the second engagement section is intermediate the first engagement section and the grip housing.

6. The throttle twist grip according to claim 4, further comprising a spring housing adapted to be fixed to the handlebar tube, with the restoring spring interconnecting the handlebar grip and the spring housing, with the sensor detecting the rotational position of the handlebar grip relative to the spring housing, with the spring housing spaced from the sensor holding section in the direction parallel to the axis.

7. The throttle twist grip according to claim 6, wherein the spring housing is received in the handlebar grip, with the handlebar grip rotatably mounted on the spring housing.

8. The throttle twist grip according to claim 6, wherein the spring housing is rotatably fixed to the handlebar grip to be rotatable about the axis of the handlebar grip by a screw or bolt connection.

9. The throttle twist grip according to claim 6, wherein the spring housing has an external diameter which corresponds to the internal diameter of the handlebar grip.

10. The throttle twist grip according to claim 6, wherein the spring housing has an engagement section adapted to engage a correspondingly formed engagement section of the handlebar tube in a nonrotatable manner.

11. The throttle twist grip according to claim 10, wherein the engagement section of the spring housing is formed on an inside of the spring housing.

12. The throttle twist grip according to claim 10, wherein the engagement section of the spring housing has a rib for accommodation in a corresponding recess provided on the handlebar tube.

13. The throttle twist grip according to claim 6, further comprising a handlebar weight, with the spring housing being integrated in the handlebar weight.

14. The throttle twist grip according to claim 13, wherein the handlebar weight is adapted to be fixed in a nonrotatable manner on the handlebar tube by a screw or bolt connection.

15. The throttle twist grip according to claim 1, wherein the sensor is one of an angle sensor, a contactless and/or non-contact angle sensor, a potentiometric angle sensor, a Hall sensor, a Hall-effect pick-up, a Hall controller, a gyroscopic sensor, a piezo sensor, a position sensor, a magnetostrictive position sensor, a shaft encoder, a magnetic incremental encoder, a magnetic angle sensor, a magnetic scale sensor, a cable extension sensor, an inductive sensor, a capacitive sensor, and an optoelectronic angle sensor.

16. A grip tube for an accelerator twist grip arranged at a handlebar tube of a vehicle for actuating an actuator which determines a fuel supply for an internal combustion engine of the vehicle, wherein the grip tube comprises an inside end region and an outside end region relative to the handlebar, an internal diameter and an external diameter between the inside and outside end regions, an assembly portion to arrange the grip tube on the handlebar tube to be rotatory and non-slidable in an axial direction, a spring engaging portion for the engagement of a return spring, and a sensor receiving portion for receiving a sensor to detect a rotational position of the grip tube, with the sensor receiving portion extending outwardly of the external diameter at the inside end region, with the assembly portion including a grip housing adapted to be fixed to the handlebar tube, with the sensor receiving portion rotatable relative to the grip housing, with the sensor receiving portion rotatably received in the grip housing, wherein the spring engaging portion is located within the internal diameter and formed in a longitudinal direction of the grip tube parallel to the axial direction in the outside end region of the grip tube spaced from the grip housing and the sensor receiving portion and, based on the longitudinal direction of the grip tube, the spring engaging portion and the sensor receiving portion are formed on the outside and inside end regions of the grip tube respectively.

17. The throttle twist grip according to claim 16, wherein at least one pressure sensor is provided measuring the pressure exerted by the restoring spring.

18. The throttle twist grip according to claim 17, wherein the at least one pressure sensor is formed and arranged for receiving an end of the restoring spring.

* * * * *